United States Patent
Road et al.

[15] 3,657,651
[45] Apr. 18, 1972

[54] ONE PIECE METER CURRENT CIRCUIT

[72] Inventors: Richard A. Road, Lafayette; James H. Schlatter, Frankfort, both of Ind.

[73] Assignee: Duncan Electric Company, Inc., Lafayette, Ind.

[22] Filed: June 2, 1969

[21] Appl. No.: 829,278

[52] U.S. Cl. ............................................324/137, 336/192
[51] Int. Cl. .......................................................G01r 11/02
[58] Field of Search ................324/137, 138; 336/192, 223; 339/28, 29, 275 RB, 276 RB

[56] References Cited

UNITED STATES PATENTS 2,656,512  10/1953  Lenehan................................324/137
2,930,980  3/1960   Scamman et al......................324/137
3,413,549  11/1968  Gill.........................................324/137

Primary Examiner—Alfred E. Smith
Attorney—Darbo, Robertson & Vandenburgh

[57] ABSTRACT

A one-piece electric meter current circuit including integral current coil and meter connectors can be formed from a length of heavy wire. First its ends are thickened by axial thrust in a die, then flattened and shaped by transverse thrust in another die to produce integral cross work-hardened blades, with shoulders for abutting an elastomeric washer at the meter base plate. A preferred circuit piece is sharply bent adjacent the blades. The forming method not only eliminates all connections (which are potentially troublesome) within the electric meter current circuit, but moreover provides work-hardened, strengthened portions in crucial regions such as at the neck of the blades.

11 Claims, 18 Drawing Figures

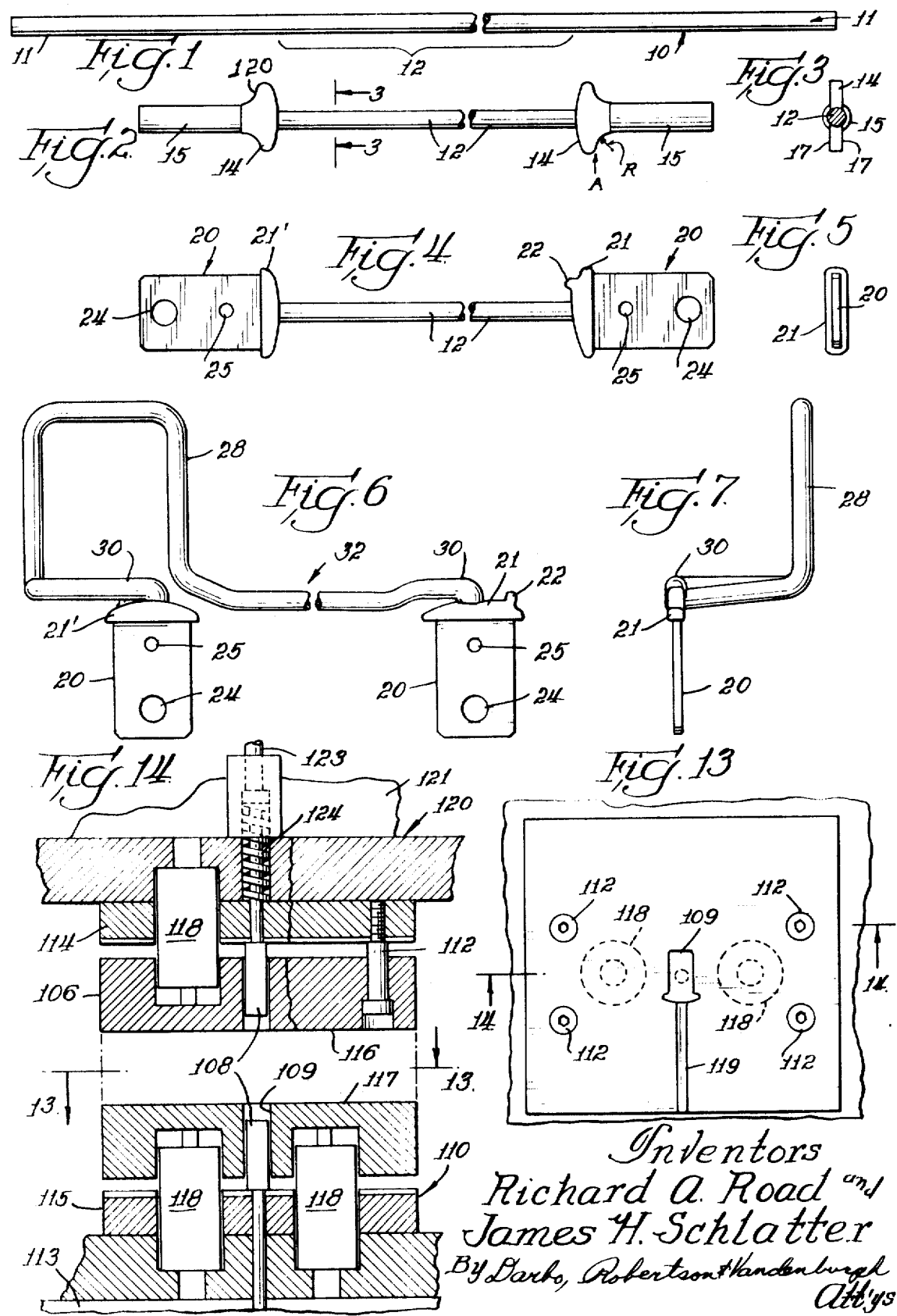

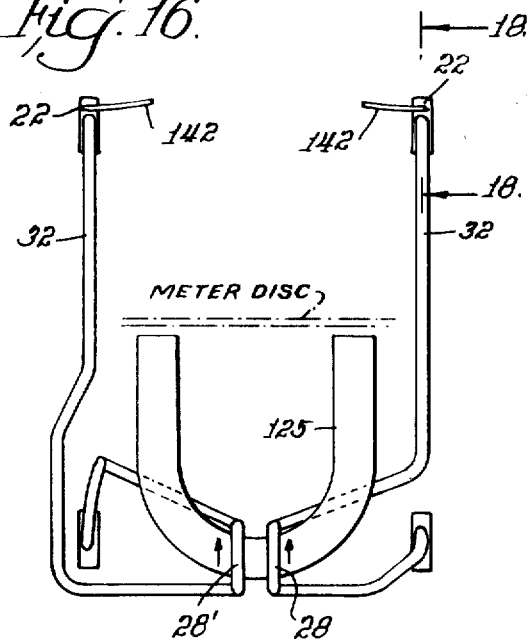
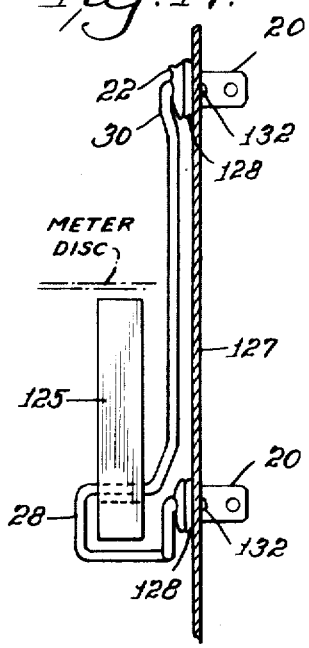
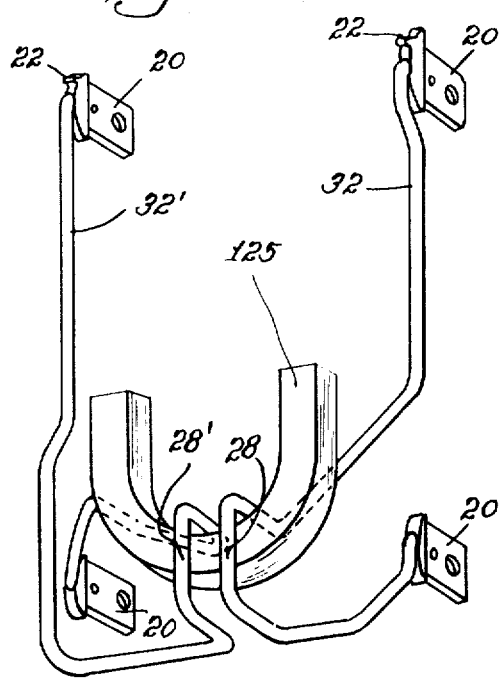
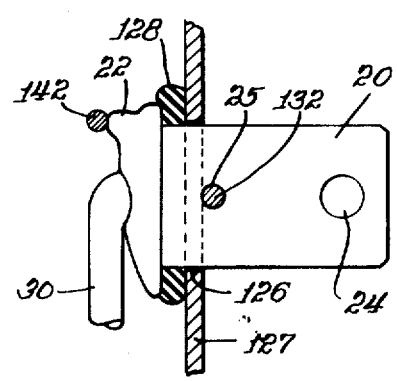

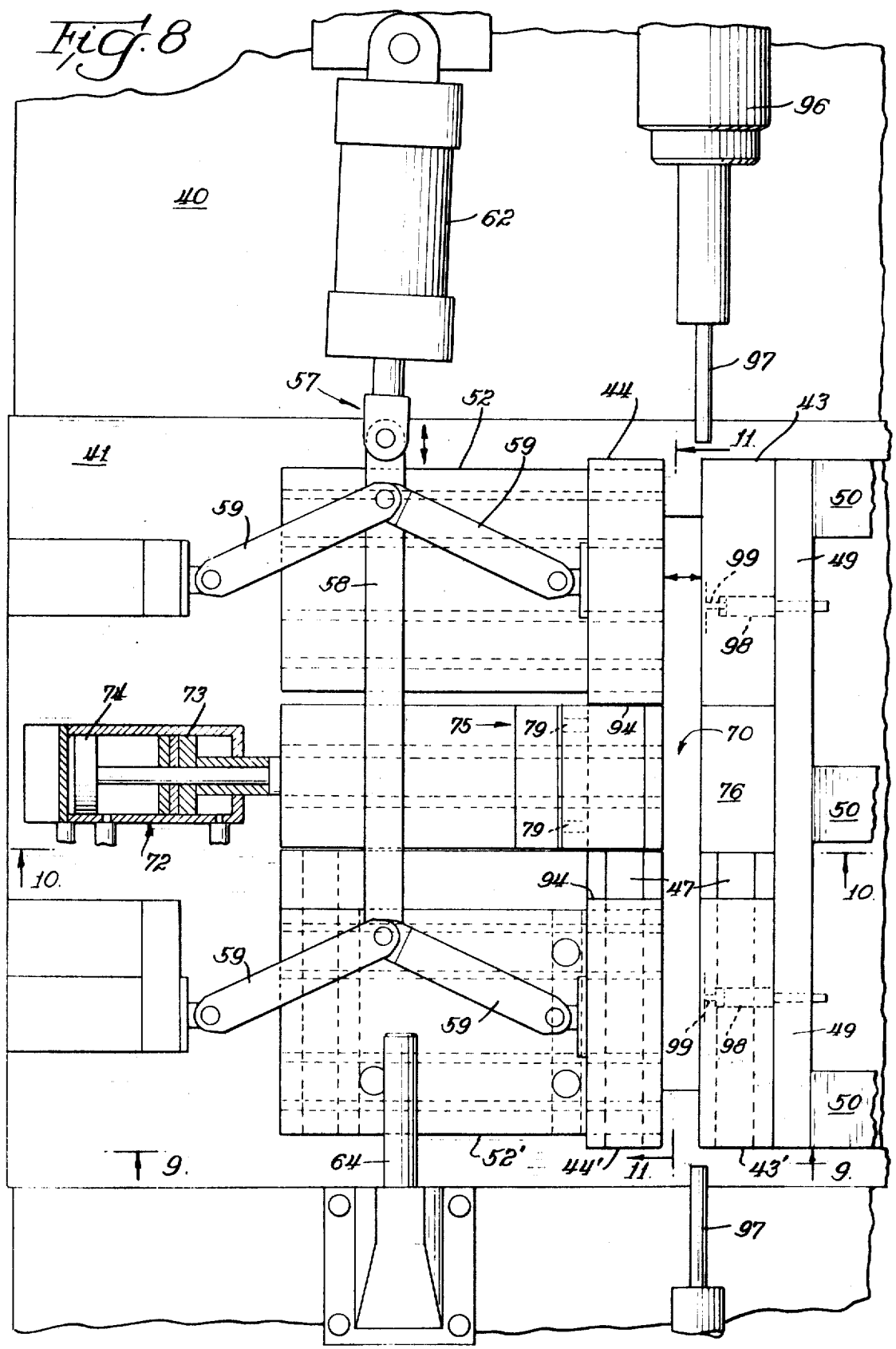

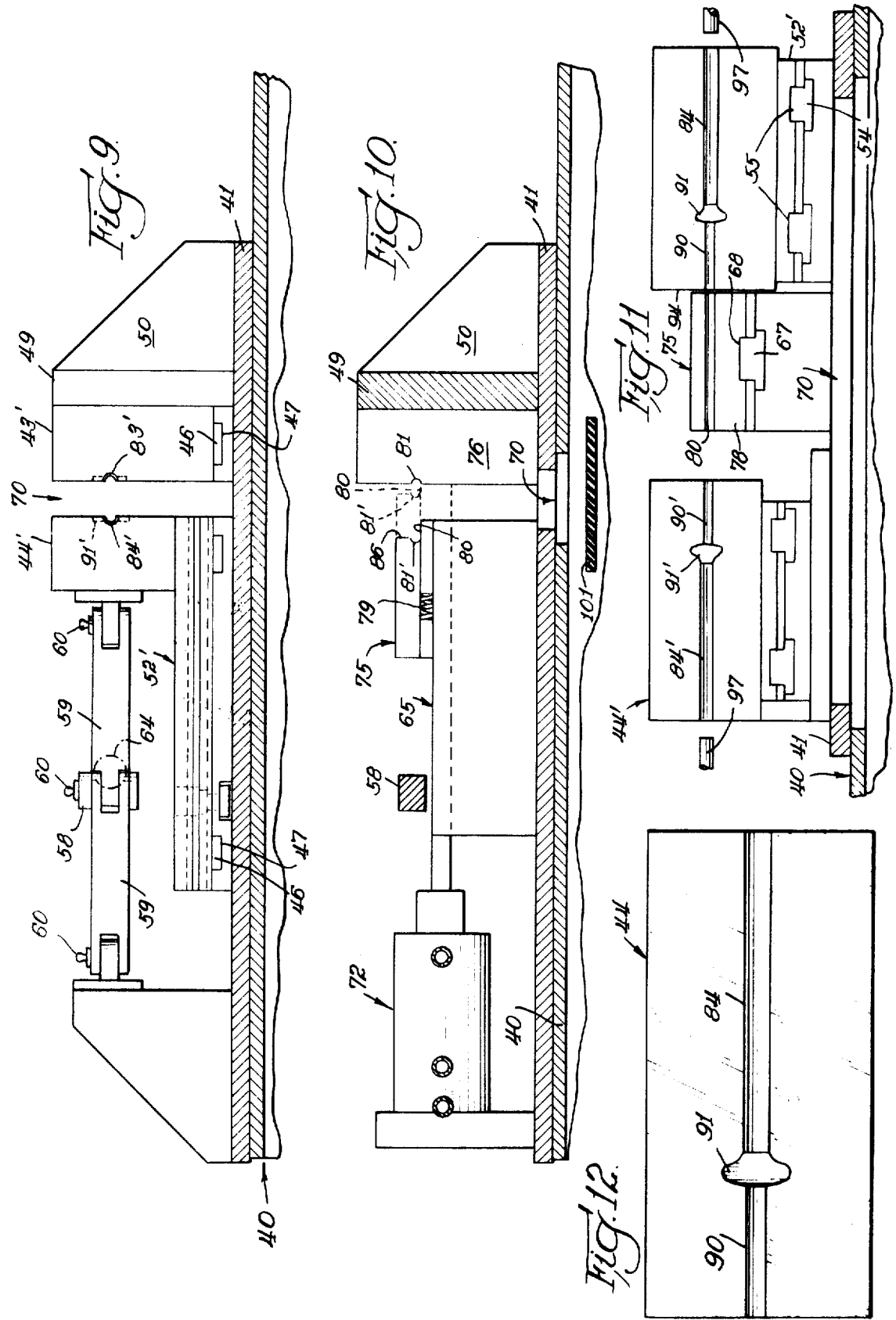

ONE PIECE METER CURRENT CIRCUIT

BACKGROUND OF THE INVENTION

This invention is in the field of electricity meters, one form of which is familiar to home owners.

The general design and construction of electric meters, technically called watt-hour meters, is well known in the art and will not be discussed in detail herein. The current in the electric service being metered flows through the meter, being typically carried by heavy conductors which may be called the current circuit. The present invention relates specifically to an improvement in the current circuit in electricity meters, to a new method of making the improved current circuit and to the equipment which is used in the manufacture of the current circuit of this invention. Both improved quality and reduced cost result from this invention.

The current circuit of a meter such as the watt-hour meter generally includes connector or terminal blades by which electrical contact between the service conductors and the functioning meter elements is made. Two such blades are in service with a coil which passes around a magnet core and with it is referred to as the "current electromagnet." In the past it has been common practice to form the coil by bending a segment of heavy wire, such as copper wire, to form the coil and joining the ends of the bent wire at right angles to the terminal blades by welding or silver soldering.

Each joint, soldered or otherwise in a current circuit, constitutes a potential trouble spot. In structures such as electricity meters which are now usually expected to provide a useful operating life in the neighborhood of at least 20 years, every point of potential trouble is of considerable importance. Presently at least one leading manufacturer of electric meters mechanically tests each and every one of the silver-soldered joints connecting the coil portion and the blade elements to determine its structural stability. Apparently this is believed necessary to eliminate the possibility of grossly defective joints. Unfortunately, however, there appears to be no way of obtaining complete assurance that each of the silver soldered joints are otherwise free of defects.

When such defects manifest themselves in use, there is at least the expense of servicing and replacement. Much more serious, however, is the possibility of power failure, even though this is rare. This is all completely avoided by the present invention.

Additional advantages can be made clear more easily after detailed description.

SUMMARY OF INVENTION

The present invention avoids the troublesome joints discussed, avoiding the failures, and saving manufacturing and servicing costs, by forming the entire current circuit (blades, coil and all) out of a single piece of metal, preferably a length of copper wire.

The preferred forming method converts relatively soft coil stock, such as copper or aluminum wire, into a complete, one piece meter circuit, including cross work-hardened blades and optionally, cross work-hardened blade shoulders having a purpose described below. The blade and shoulder portions are thus formed by a preferred method comprising the steps of first subjecting the ends of the stock wire to sufficient axially directed pressure to upset and thicken them, and then subjecting the thickened end portions to deforming forces which are exerted laterally, i.e., perpendicularly to the axis, to flatten the thickened end region into a blade-like configuration. As discussed below this has a beneficial work-hardening effect, characterized, in fact, as cross work hardening.

DESIGNATION OF THE FIGURES OF THE DRAWINGS

FIG. 1 is an elevational view of a segment of wire stock from which the improved preferred one piece electricity meter current circuit of this invention is fabricated;

FIG. 2 shows the approximate condition of the stock after the ends are upset in accordance with this invention;

FIG. 3 is a cross-sectional view taken along the line 3—3 in FIG. 2;

FIG. 4 is a plan view showing the condition of the article after the upset ends are flattened to provide a blade and a blade shoulder;

FIG. 5 is an end view as viewed from either end of FIG. 4;

FIG. 6 is an elevational view showing the condition of the piece in FIG. 4 after it is bent to provide a coil;

FIG. 7 is an end view of the article shown in FIG. 6 as viewed from the right hand side of the Figure;

FIG. 8 is a plan view of an apparatus for thickening the end region of the coil wire stock to provide the structure illustrated in FIG. 2 above;

FIG. 9 is an elevational end view of the portion of the apparatus shown in FIG. 8 as viewed from the bottom of the page, the toggle-stop, and the piston being removed for the purpose of illustration;

FIG. 10 is a cross-sectional view taken along the line 10—10 in FIG. 8;

FIG. 11 is a fragmentary cross-sectional view taken along the line 11—11 in FIG. 8;

FIG. 12 is an enlarged elevational view showing the configuration of the stock-retaining chamber (matrix die) used for thickening and shaping the end portion of the coil stock in accordance with this invention;

FIG. 13 is a plan view of the die equipment used to flatten and shape the thickened end portion of the stock;

FIG. 14 is an elevational cross-sectional view taken approximately along the line 14—14 of FIG. 13;

FIG. 15 is a schematic perspective view showing the one piece current circuit of this invention in position in conjunction with the current magnet of an electricity meter;

FIG. 16 is an elevational view as viewed from the front of an electric meter showing the configuration of the current coil and current electro magnet as they would appear in an electricity meter, all other elements having been removed;

FIG. 17 is an elevational view taken from the right hand side of FIG. 16 showing the electric meter current electro magnet, the right hand coil of FIG. 16 in its relative position thereto, and the base plate of the meter assembly; and FIG. 18 is an enlarged cross-sectional view taken approximately along the line 18—18 in FIG. 16.

DESCRIPTION OF THE PREFERRED EMBODIMENTS

Although the following disclosure offered for public dissembination, in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Steps In Formation Of One-Piece Current Circuits

Successive stages in forming the one-piece current circuit of FIGS. 6 and 7 are shown in FIGS. 1 to 5.

In accordance with the preferred embodiment of this invention, a wire segment 10 (a length of wire), is used to fabricate the entire one piece current circuit. Wire 10 is of a material which is work hardenable and is suitable for electric conduction (such as copper or aluminum). In accordance with this embodiment of this invention we prefer to use round wire stock, e.g. 0.229-inch diameter. The wire is first cut into segments or lengths, the length of each segment being determined by the requirements of the specific meter being manufactured. The wire segment or blank is shown in FIG. 1 and may be considered as having end portions 11 and a medial region 12. The ends 11 of wire 10 are first thickened, i.e. upset, by force applied endwise, while the confined wire is held with its ends within a matrix die or confining chamber, as described below.

FIGS. 2 and 3 show the partially formed blank which results. Each end portions 11 of wire 10 is thickened locally to provide shoulder mass 14 and a moderately thickened terminal along the remaining portion 15. It is noted that the cross-sectional configuration of the enlarged shoulder mass 14, as seen in FIG. 3, is not circular but is somewhat flattened due to the configuration of the matrix die walls.

This partially formed blank is now further formed by pressure applied transversely as described below; then holes are punched in it. FIG. 4 shows the resulting piece. The thickened portions 15 have been flattened and squeezed out laterally to form terminal blades 20. Thickened portions 14 have been simultaneously squeezed out laterally to form collars 21, 21'. The cross-sectional area of blades 20 remains greater than that of the wire in medial portion 12, providing blades of the standard size; and the cross-sectional area of collars 21, 21' remains even larger. Heavy cross sections not only increase electrical conductance but also more effectively conduct heat out from the meter to the external conductors. Heat is naturally generated in any meter under heavy load conditions. Ear or tab 22 used for a potential coil connection, can be fabricated in the flattening step referred to immediately above, although it is preferably formed by a separate coining step in which a portion of shoulder 21 is pinched to provide the projection 22. Each blade 20 has been punched to provide larger circular opening 24 and smaller circular opening 25. Shoulder 21 is a relatively heavy structure which extends radially beyond blade 20 around the entire periphery of blade 20.

Middle region 12 is now bent to shape the piece into the general configuration of a coil as dictated by the needs of the specific meter being manufactured. Thus the middle portion 12 may be bent to form a single open loop 28 as illustrated in FIG. 6 offset as seen in FIG. 7 for use as shown in FIGS. 15 to 18. For other meter designs, other shapes would be used, and these could include closed loops. Also sharp bends 30 are formed immediately adjacent the shoulders 21, 21'.

Some of the advantages of this invention can be achieved with a different manner of forming a one piece current circuit, namely stamping from flat copper stock. The stamped-out piece may have a configuration similar to that of FIG. 4. Sharp edges are then rounded off by conventional means in order to minimize the risk of corona discharge. The piece is then bent to conform generally to a coil-blade configuration such as is illustrated in FIGS. 6 and 7 or as a specific meter may require. In place of collar 21, the punching may form laterally extending ears for bearing on a conventional metal washer upon installing in a meter.

This is not the preferred form of the invention because it does not provide all of the advantages discussed below.

PRETHICKENING APPARATUS

FIGS. 8 through 12 illustrate the apparatus which is preferably used in the axial cold working of the wire stock generally 10 to provide the thickened article illustrated in FIG. 2. FIGS. 13 and 14 show the die configuration and special action die preferably utilized to convert the article shown in FIG. 2 to the structure shown in FIG. 4.

The axial-thrust apparatus, generally 39, includes a heavy metal table top 40 by which the various components are directly or indirectly carried. An extremely heavy one-piece table top has been chosen to assure maintenance of precise orientation and configuration during the application of the heavy pressures and forces involved in clamping the wire stock and thickening the stock. Most of the equipment components are assembled on assembly plate 41 which in turn is secured to table 40 by conventional bolts and the like. The matrix die consists of two sets of opposing halves, each set including a "stationary" die 43, or 43' and movable die 44, or 44'. Both halves 43, 43', and 44, 44' respectively, are immovable while the wire stock is being shaped, however. In an embodiment which some manufacturers may prefer the axial distance between the two sets of dies is adjustable by moving at least one set of the dies along axially extending tracks 46 and grooves 47. Immovable dies 43, 43' are backed up by reinforcement plate 49 and supports 50. Movable dies 44, 44' are supported on carriage 52, 52' which slides toward and from the wire, along tracks 54 and milled grooves 55. Carriages 52, 52' are moved back and forth by toggle mechanism generally 57. Toggle mechanism 57 includes slotted drive bar 58 and toggle arms 59 which are suitably hinged in drive bar 58. Lubricating means 60 are provided at each of the pivoting points in the toggle mechanism 57. Drive bar 58 is activated by hydraulic cylinder and piston mechanism 62. Thus the outward thrust provided by cylinder mechanism 62 moves drive bar 58 towards the stop means 64, and in so doing urges movable dies 44, 44' laterally into abutment with stationary die 43, 43', rigidly mounted stop 64 preventing overshoot of drive bar 58. Stop means 64 is positioned to permit toggle mechanism 57 to move slightly past dead center, to lock itself against movement which would permit movement of dies 44, 44'. Inward thrust of cylinder mechanism 42 reverses the action, drawing drive bar 58 towards cylinder 62 thus moving movable dies 44, 44' away from stationary dies 43, 43'.

Carriage 65, which is more or less centrally located is also movable toward or from the wire on track 67 in milled slot 68. Carriage 65 is moved independently of carriages 52, 52'. When carriage 65 is in its fully retracted position, i.e. as illustrated by the solid lines in FIG. 10 a completely open passageway or channel 70 exists between opposing faces of movable and stationary elements hereinbefore described. Slideable carriage 65 is activated by pneumatic piston means 72 having two pistons 73 and 74. Outward thrust of pneumatic piston means 72 moves carriage 65 and with it superstructure or movable clamp 75 towards stationary clamp plate 76. The equipment is cycled to actuate only the first piston 73. This first piston 73 is designed to stop when the outward motion of the superstructure 75 moves its shelf 78 against stationary clamp plate, the parts then being positioned approximately as indicated by the dotted lines in FIG. 10. Shelf 78 is retractable but bears on clamp plate 76 because it is urged toward it by springs 79. At this point, a wire segment 10 of FIG. 1 is fed by a pair of feeder fingers (not shown) which grip its ends and lower it through the slit between face 86 and clamp plate 76, releasing it on shelf 78. The wire segment is aligned with recessed portions 81, 81' of the clamp plate and central carriage superstructure 75. It is then also aligned with the recessed portions 83, 83' of immovable matrix dies 43, 43' and the recessed portions 84, 84' of the movable matrix dies 44, 44'. It is accurately centered axially by the feeding fingers. The cycling of the apparatus is such that the second piston 74 of piston means 72 is now actuated, and it urges carriage 65 and movable jaw 75 further toward clamping block 76. This continued motion is permitted by relative retraction of retractable shelf 78 under movable jaw 75 against the opposing action of spring 79. Eventually the wire segment is gripped between opposing recessed surfaces 81, 81' as the forward face 86 of movable clamp 75 approaches clamping block 76. This brings the wire segment into axial alignment with the recessed portions of the stationary matrix dies 43, 43'. As cycling of the apparatus continues, toggle activating piston means 62 is activated to move movable dies 44, 44' into abutment with stationary dies 43, 43'. The dimensions are such that the wire segment 10 is now firmly and immovably clamped by medial portions 90, 90' of the recesses in the dies. The medial portion is substantially the entire recessed portion between the bulbous recess 91 and the medial edge 94, 94' of the dies. A considerable length of the terminal portions of the wire stock extends into the chambers defined by the bulbous enlargements 91, 91' and enlarged end portion 84, 84' of the opposed matrix dies. Exactly the right length extends into each die chamber.

Continued cycling of the cycling apparatus or control system thereupon energizes (at each end of wire 10) hydraulic plunger die piston means 96, causing plunger or plunger die 97 to enter into the cavity between opposing matrix die blocks, (see 84 in FIG. 11) with which the plunger 97 fits snugly. Plunger 97 engages the end of the wire being held in place, and drives the ends of the wire axially. The two plungers 97 thus drive toward each other. Sufficient force is supplied by the plungers to cause sufficient cold flow of the metal so that it takes the shape of the matrix die recess. It is noted that there is no buckling between the wire end portions. This is prevented by very firm gripping of the wire by medial portions 90, 90' of the dies, as well as by the straight alignment of the wire in the line of thrust, the central section being held by grooves 81, 81'.

Development of this invention has shown that it is critical that in those embodiments in which a shoulder portion 14 is to be formed at this stage, there must be no sharp die corners around which the flowing metal must move. The radius (see R in FIG. 2) of the curve between end 15, and the lateral projections of shoulder 14, must be at least five sixty-fourths inch due to space limitations, the maximum is about seven sixty-fourths inch. While slightly larger radii than this range are tolerable, shorter radii are not consistently inoperative.

In the continued cycling of the apparatus plunger, die 97 is withdrawn and toggle piston means 62 is energized in the reverse direction, thus causing carriages 52, 52' and movable dies 44,44' to move away from matrix dies 43, 43', and from the wire article still held by superstructure 75. The cycling apparatus now causes supply of air to the retraction port of piston means 72 to withdraw carriage 65 from opposing clamping block 76. During the initial withdrawal movement of carriage 65, shelf element 78 lags behind until stop means (not shown) prevents further withdrawal of shelf element 78 from under superstructure 75. At this point shelf element 78 is still in abutment with clamping block 76 and is serving to support the wire stock. Continued withdrawal of carriage 65 causes the shelf element 78 to move therewith, thus opening drop channel 70. The cycling apparatus then supplies air to actuate eject piston means 98, 98' and thrust ejection pins 99 outwardly to strip the article from the dies so that they drop through discharge space 70 to a receiver or conveyor 101. At this point the prethickening cycle is complete, and the entire cycle may be repeated to prethicken the next article.

The cycling apparatus has not been shown, its units being commercially available. An "Agastat" 12-step programmer of Agastat Division of Elastic Stop Nut Corp. has been found suitable, being used to control various solenoid valves. It uses individual timers for the successive steps, triggered by external switches each actuated by completion of a previous step.

The conveyor 101 may deliver the thickened blanks to a feeder (not shown) for feeding them to the next portion of the apparatus. The transfer and feeding may be manual however.

The apparatus is different from the usual cold heading apparatus in acting on both ends simultaneously and in having all of the cold flowing at one end occur within the stationary die cavity formed by the two die halves 43 and 44. This avoids the flashing likely to occur where the usual two dies come together by axial movement.

The pressure exerted by the cold flowing metal on die half 44 has been found to present a problem. To withstand this pressure adequately, two toggle linkages for each die half have been shown. These can be so located that the center of cold-flow thrust is between them so that they can resist a rocking tendency. As the form of thickening apparatus now preferred solves the problem in an even safer way by using dies each of which extends the full length of wire 10, this leaves no room for intermediate carriage 65 and the parts it carries. The function of shelf or rack 78 is accordingly performed by fingers similarly positioned but preferably carried by fixed clamp plate 49, and moved by separate actuation controlled by the cycling apparatus.

FINAL BLADE PRESSING

FIGS. 13 and 14 illustrate the apparatus employed in a conventional hydraulic press for shaping the shoulder and the connection blade. FIG. 13 is a plan view of a die face, e.g. as viewed along the line 13—13 in FIG. 14. The other die face is a mirror image of the view shown in FIG. 13. The lower half 105 and upper half 106 of the die includes plungers or punches 108 and matrices 109. Moreover, lower half 105 and upper half 106 of the die may be considered to be floating, in the sense that both the lower half 105 and upper half 106 are movable along precision dowel pins 112. The extremes of the motion are limited in one direction by the heads of the dowel pins, and in the other direction by abutment of upper half 106 and lower half 105 against backup plates 114 and 115 respectively. Customarily the lower assembly 110 of the die combination is "stationary," in the sense that it is carried by stationary elements or bed 113 of the press structure.

An article having the configuration shown in FIG. 2, herein, is placed in the recess 109 of the lower half 105 of the die. The upper assembly 120 is lowered by press slide 121 by which it is carried. When opposing faces 116 and 117 abut, the article shown in FIG. 2 is clamped within opposing recesses in the region 119. Continued downward movement of the press slide 121 causes both upper half 106 and lower half 105 of the die to work against compression means such as "Hydra Springs" 118 (Trademark of Wales Strippit Inc., Akron, N. Y.). This maintains extremely high compression of halves 105 and 106 against one another while allowing them to float jointly unaffected by the further movement of the press in moving upper plunger 108 toward lower plunger 108. As a result, the round wire adjacent to collar 21 is centered as to the collar 21 with substantial accuracy. This is desirable because the thickness through the collar equals the diameter of the wire, and without centering there would be a resistance-increasing offset. Finally the plungers or punches 108 squeeze and flatten out the portion of the article held therebetween them. The press stroke is of such length that it squeezes out the contained metal to fill the die cavity by cold flowing to take the shape of the die cavity.

The main advantage of this floating die mechanism, as hereabove described, is that it maintains blade 20 in almost precise alignment with the wire stock 12 as the blade is formed. The equality of compression by halves 105 and 106, together with their floating relationship to plungers 108 allows them to accommodate themselves to stay centered with respect to plungers 108 while the forces applied by plungers 108 at right angles to the axis of the wire stock form blade 20 and shoulder 21 at the end of the wire stock. The blade 20 and shoulder 21' at the other end may be formed in the same die by reversing the ends and repeating the pressing, or two die mechanisms can be used simultaneously.

The configuration of the article in FIG. 2 at the juncture of the shoulder mass 14 and thickened end portion 15, namely the region 120 in FIG. 2 is of considerable importance. By using the configuration illustrated in FIG. 2 a serious problem is avoided. If either the thickened end portion 15 or the shoulder mass 14 is caused to flow outwardly at a substantially greater rate than the other portion, the metal in the region marked 120 in FIG. 2 would tend to form a bulge and subsequent pressing of the other portion would merely bring abutment of the other portion against the preceding bulge. The result in the finished blade would be a crack or fissure-like defect which would result in substantial loss in strength of the blade at the juncture, even though the reduction in initial electrical conductance, etc., may not be significant. However, as a consequence of the use of the approximate configuration shown in FIG. 2 with the shoulder-edge of the die in the second step meeting that configuration at the point indicated as A in FIG. 2, the blade and shoulder portions, particularly at the juncture 120, flow at substantially the same rate with the result that blade and shoulder portion 21 are integral and are free of strength-reducing cracks or fissures.

It is quite desirable that the final pressing be done in a confining chamber in which all outside corners are somewhat rounded so that the resulting flattened structure is devoid of sharp, square outside corners.

As slide 121 is raised, lower plunger 108 is caused to rise with it to eject the piece from lower die half 105. This is accomplished by an air cylinder not shown, supplied with air at this time and acting to bias rod 122 upwardly. After it has stripped the piece the air will be supplied to the return port to retract lower plunger 108 to the position shown in FIG. 14. As slide 120 approaches the top of its stroke rod 128 will be restrained to strip the piece from upwardly moving upper plunger 108. Spring 124 will retract upper plunger when the slide 121 starts down again.

PUNCHING, EAR FORMATION AND COIL-FORMING

In another step, holes 24 and 25 are punched in each blade on a conventional punch press.

In one of these steps, or as a separate step, shoulder 21 of one of the blades is coined to provide ear 22 which serves as a point of attachment for the relatively fine lead wire of a potential coil.

As indicated above, the article is then shaped, on conventional equipment, for working suitable bends in section 12 with the result that an article 32 similar to that illustrated in FIGS. 6 and 7 is formed.

It will be noted that when starting with a straight wire or blank, abrupt bends adjacent the blades are needed, where previously there has been right angle joining. This need may have been one of the factors which has apparently discouraged thinking of one-piece current circuits heretofore; but instead of being disadvantageous, it may even be advantageous because of its work hardening effect described below.

SECURING CURRENT CIRCUIT IN METER

Inasmuch as the use of current coils in electricity meters is conventional, the complete detail of electricity meter structures which include the coil of this invention will not be included herein. However the drawings of FIGS. 15, 16 and 17 show the relative position of the novel one-piece electric current circuit 32, 32' and conventional electric meter current core 125, in a conventional electricity meter such as a watthour meter. It is noted that two separate current circuits are illustrated in FIGS. 15 and 16. Each is a complete current circuit in the sense that it provides a total path for the current through the meter. Two are shown because the meter chosen for illustration is intended for three wire service requiring two current circuits through the meter, the directions of current in loops 28, 28' being such that their effect in energizing the current core 125 is additive.

FIGS. 17 and 18 illustrate the attachment of the one-piece current circuit of this invention to the base plate 127 in an electric meter. Thus the one piece current circuit of this invention is initially fitted with elastomeric gasket 128, which washer fits tightly around blade 20 and abuts shoulder 21, 21'. Thus each blade is fitted with washer 128. The blades 20 are passed through openings 126 in insulating meter base plate 127 and considerable force is applied to compress washer 128 sufficiently to enable a pin such as a cotter key 132 to be passed through hole 25. The presence of pin 132 in hole 25 at the outside of base plate 127 maintains the compression of washer 128 against the inside of insulated base plate 127 and shoulder 21, 21'.

Thus, it is apparent that in accordance with the use of the preferred one piece current circuit of this invention it is no longer necessary to provide a specially made high strength washer, such as stainless steel washer (not shown) conventionally used to compress the elastomeric gasket when securing the current circuit element to the base plate.

MATERIALS

In practicing this invention tin clad copper wire or other "clad" wire can be used in the manner previously described. Surprisingly, the surface metal thins out more or less evenly and covers virtually the entire surface of the current circuit piece, all except the tip ends and the punched holes. The use of tin clad copper wire makes unnecessary the tin plating which has been widely used in the prior fabricated current circuits.

There has long been recognition that the use of aluminum current circuits would theoretically be desirable, but problems such as the susceptability of aluminum to corrosion when in contact with the copper jaws of a suitable mounting device had not heretofore been solved. According to the present invention the economy inherent in the use of aluminum can be satisfactorily achieved by using a "clad" aluminum. If copper clad aluminum is used, the corrosion resistance is approximately that of a copper current circuit, and if, in addition, tin cladding is used, the corrosion resistance and consistently low joint contact resistance are comparably better.

UNEXPECTED ADVANTAGES

An unexpected advantage of the described preferred form of production is that the edges are well rounded instead of being sharp, making unnecessary a tumbling step previously required due to sharp edges or even burrs of the blade pieces.

Another unexpected benefit from the described preferred forming of one-piece current circuits, is in the resulting work-hardening which provides a harder end product than did the prior, fabricated, current circuits. In the factory, the current circuit elements are handled in large quantities, usually lying loose in trays or carts or bins. Under these rough handling conditions blades are somewhat subject to being nicked and deformed. It is highly desirable that the blades have perfectly flat surfaces, in order that there be maximum contacting of the surfaces when the blade is inserted into a clamp to connect the meter in service. Thus it is highly desirable to provide a structure which virtually eliminates the deforming or nicking risk during in-plant manufacturing handling. Hardened stock was used for blades but this did not eliminate the damage. It is now realized that this is partly caused by the annealing during silver soldering. The high temperatures needed for silver soldering anneal the blade and thus drastically reduce its strength and hardness, especially in its crucial neck region. For this reason and because "dead soft" wire is conventionally used to manufacture the coil, the silvered soldered current circuit was particularly susceptible to nicking and to the action of deforming forces.

High temperature silver soldering is avoided by the present invention, even though potential leads are soft soldered to ears 22. The wire used in the potential circuit is relatively small (compared to that of the current circuit 32.) Also the high strength which is necessary at the conventional joint between the current coil and the blade, is not required at the joint between current circuit lead 142 and ear 22. Hence, while silver-soldering was the fastening technique of choice between the blade and coil lead, the potential connection at ear 22 is suitably made with an eutechtic solder such as 6337 (63 percent tin — 37 percent lead, which melts at about 361° F. v. 1,391° F. for silver-solder.) It will be appreciated, therefore, that the relatively low temperature, eutechtic soldering of the potential lead 142 to ear 22 will not substantially diminish the hardness of the preferred integral current circuit of this invention. In spite of starting with soft wire, the finished blades and adjacent sharp bends are work hardened. Indeed, the blades have the benefit of cross working.

All of the shaping which is accomplished in the thickening step is accomplished by axial thrust of the plungers (97 in FIG. 8) into a shaping die combination. It is apparent that the direction of the working forces is along the axis of the wire and that the majority of the movement takes place in the axial direction. In this sense the first "working" of end portion 11 of the wire is in the axial direction.

In the second step, the terminal portion 15 and enlarged shoulder mass 14 are subjected to flattening by compressive force in a direction which is perpendicular to the axis and to the relatively flat surfaces 17 of shoulder mass 14. The flow of the metal is also mainly transverse of the wire axis. Thus, the second step of the cold-working of the initially relatively soft coil stock is again a cold-working hardening, step, but one in which the working forces are exerted in a direction which is substantially perpendicular to the direction in which the initial cold-working forces were applied. Thus there is "cross working." Observation and testing of the resulting structure indicates that this "cross working" provides an improved hardness and improved tensile, and yield strength.

In prior current circuits using dead soft wire, the wire was work hardened only at the bends forming the coil. According to the present invention there is additional work hardening of the wire lead namely immediately adjacent the blades. This may be a most important point for resisting some of the forces tending to misalign the terminal blades 20.

COMPARISON EXAMPLES

A one-piece, coil-blade circuit 32 of this invention was formed as described above using dead-soft copper wire stock. To compare hardness characteristics, a conventional circuit was prepared by silver-soldering a coil to a blade prepared from "hardened" flat-stock conventionally used in the manufacture of current circuits. A third article, a piece of hardened flat stock from which the conventional circuit blade was fabricated, was also obtained for this test.

Preferably conventional current circuits are tin plated and the coil portion insulated prior to assembly in a meter. However, since the tin-plating is not done at high temperatures, and the presence of tin would alter the surface of the blades, etc., this step was omitted from the procedure of this example for the purpose of obtaining meaningful data to illustrate any change in hardness characteristics, and thus change in tensile strength, due to work-hardening, annealing, etc., in processing. All pieces were tested for hardness initially, (the two circuit pieces in their completed form) and again after baking in a 400° F. oven for 15 minutes. This heat treatment was used because it is conventional to heat the coil portion prior to its treatment in a fluidized bed for insulation purposes. Upon cooling in air to room temperature, hardness was again measured. The results, showing hardness on the Rockwell F Scale, are summarized in the following Table.

TABLE

| Article tested | Initial hardness, Rockwell "F" | | Hardness after 400° F., Rockwell "F" | |
|---|---|---|---|---|
| | Near junction | At blade tip | Near junction | At blade tip |
| A..... Flat blade stock | (83) | | (83) | |
| B..... Conventional circuit (silver soldered) | 43 | 83 | 43 | 83 |
| C..... Circuit of this invention | 95 | 95 | 87 | 87 |

With conventional current circuits, this data shows that much of the initial hardness of the flat blade stock (A) is lost (83 to 43) Rockwell "F" in the crucial neck region upon silver-soldering the coil thereto, during the manufacture of a conventional soldered meter circuit. The blades of this preferred embodiment of this invention (C) have an even higher degree of hardness throughout the blade, than the initial hardened flat stock, even though the circuit pieces of this invention were fabricated from dead soft copper wire. Although some of the hardness resulting from this invention was lost by the 400° F. treatment, the hardness throughout was still 87 Rockwell "F" as compared to gradations from 83 Rockwell "F" down to 43 Rockwell "F" for the silver-soldered blade.

Even though the invention would be highly desirable for other reasons, if not superior in hardness and strength, such unexpected advantages enhance its value.

ACHIEVEMENT

The one piece current circuits have been successfully produced according to the present invention after an attempt to induce their manufacture by others was fruitless. It is clear that all risk of the in-use trouble which has been potentially present due to the presence of silver soldered connections in a meter current circuit is eliminated, as well as the manufacturing problems and expense of such fabrication. In the preferred current circuits of this invention, the cross-work hardened blades have higher strengths and hardness particularly in the crucial neck region. Such circuits are thus especially resistant to inadvertent damage both before and after incorporation in the meter.

The one-piece current coil has advantages to both the manufacturer and consumer. It lowers the manufacturing cost and eliminates a possible joint failure that could result in high replacement and repair cost, a potential fire hazard and a personal safety hazard.

Since only wire is used to manufacture the one-piece current coil, a direct material savings is achieved. The flat stock with the rounded edge normally used to manufacture the contact blade is no longer necessary. Since the wire is in coil form, less storage area is required achieving another cost saving. The wire that is later cold thickened and flattened into the blades in accordance with this invention as a substitute for the flat stock which is silver soldered or otherwise incorporated into the current coil circuits, is less expensive than the flat stock, creating a favorable rate variance.

A direct labor savings comes from the elimination of several operations needed to produce the welded or three-piece coil. All of the operations connected with the making of the joint between the blades and the current coils are eliminated. The thickening operation and flattening operation could be considered substitutes for the blade forming operations on the standard coil which gives us the net results of fewer operations to produce the coil.

The indirect labor savings are primarily inspection operations. The welded coils are conventionally 100 percent inspected to insure the quality of the joints. There are also several inspections required on the forming of the contact blade. In the method of this invention it is anticipated that there will be a substantial reduction in the number of inspections and decreased time involved in these inspections, thus decreasing the amounts of indirect labor that is involved in producing the coil.

We have found that the one-piece current coil manufacturing process of this invention results in less scrap material than the methods heretofore used to produce the coil.

The preferred method of manufacture of the one-piece current coil of this invention starts with dead-soft wire. However, because of the various cold-working operations the finished coil is much more durable than the welded coil. The welded coil undergoes several bending operations which harden the wire it bends and gives structural strength to the coil such as that in the one-piece process of this invention. However, much of this hardening is lost during the silver soldering operation, particularly near the silver-soldered joint, e.g., near the junction between blade and coil. Silver soldering requires temperatures in excess of 1,391° F. which is higher than the annealing temperature of copper. Because of the silver soldering operation, the hardness of the blade and the coil near the junction decreases from a reading of 83 on the Rockwell F. scale to 43 on that scale, for example. The one-piece blade, however, retains the hardness of 87 Rockwell F. scale. This increase in hardness results in increased stability in the coil with the result that the coil can travel from its initial formation to the various finishing processes and through the assembly steps in which the coil is incorporated into the meter, without being deformed by normal handling. In the newer, more compact, watt-hour meters, this lower deformation rate becomes essential. In a standard coil manufactured in accordance with heretofore available techniques a straightening operation is often needed before the coil can be assembled into the finished meter product.

Another cost savings to the manufacturer results from the elimination from a small stainless steel compression ring heretofore conventionally used to compress a rubber gasket into a V slot around the junction between the contact blade and the base plate of the meter. The elimination of this part provides a reduction in both direct material costs and direct labor costs.

Another advantage which would benefit both the manufacturer and the user, and by no means less important than the cost reduction, is the high quality achieved by eliminating the troublesome joints. Since a watt hour meter is such a long-service item, the more troublesome items that can be eliminated, the less the repair cost that the manufacturer will suffer during the life-span of the product and the better his customer relations.

While the advantages to the consumer may not appear as many in number, they are nonetheless of equal, if not greater importance. If a joint between the contact blade and the coil were broken, the least problem that would result would be an interruption of electric service to the customer. The power company would then suffer the cost of installing a new watt-hour meter and the cost of repairing the old meter, in addition to possible loss of customer relations because of the interrupted service. The direct financial loss or other loss suffered by the customer because of the interrupted power service could be substantial.

The existence of joints in the current coil circuit increases the risk of a weakening or fracturing which could also cause this joint to become more resistive. High currents passing through such a joint could create a greater amount of heat, possibly causing a fire, thus increasing the risk of damage or destruction to the surface that the meter is mounted on. Since single phase watt hour meters are oftentimes mounted on, or in, a residential building, the resulting fire could be of utmost significance.

If the joints were severed before or during the installation of the meter, a self-sustaining arc to ground could be started. This arc, depending upon the available current, could cause the meter to virtually explode in the meter man's hands as he installs the meter. This explosion could result in injury or death to the person holding the meter. In conclusion, elimination of possible joint failure by elimination of all joints in the coil circuit necessarily reduces the risk of incurring a high replacement or repair cost, a potential fire hazard, and a personal safety hazard. In accordance with this invention, these advantages are achieved in addition to the substantial lowering in the manufacturing costs.

RECENT REFINEMENT

Because of the normal variation in diameter of commercially available copper wire, there is also normal variation in the amount of metal present in the enlarged end portion 15 after the first, end-thickening step. This variation in amount of metal may result in an excess amount of metal present in the blade forming step. Since a completely enclosed die cavity is used in the blade forming step, (except for the wire-shaft opening 119) excess metal in the die results in extrusion of the excess out shaft opening 119 with resulting increase in length of shaft portion 12. Any variation in length of shaft 12 results, ultimately, in an equal variation in the distance between blades 20 and the assembled meter. Therefore, we now prefer to make the shaft 12 approximately one-sixteenth inch shorter than required, and then, while the unit is still in the condition illustrated in FIG. 4, stretch the unit to a standard length for maximum precision.

We claim:

1. An electricity meter current circuit which includes a current coil and connector blades by which the meter current circuit is incorporated into a circuit outside of the meter, characterized in that the blades and the coil comprise a continuous one piece unit, each blade being a flat portion of the same stock as the coil, and of greater cross-section area as a result of lengthwise compaction, and flattening with lateral spreading.

2. An electricity meter current circuit which includes a current coil and connector blades by which the meter current circuit is incorporated into a circuit outside of the meter, characterized in that the blades and the coil comprise a continuous one-piece unit, each blade being a flat portion of the same stock as the coil, and of greater cross-section area;

and being in a cross work-hardened condition of having been thickened by forshortening and then laterally spread, both by cold-flow squeezing.

3. An electricity meter current circuit which includes a current coil and connector blades by which the meter current circuit is incorporated into a circuit outside of the meter, characterized in that the blades and the coil comprise a continuous one piece unit, each blade being a flat portion of the same stock as the coil, and of greater cross-section area as a result of lengthwise compaction, and flattening with lateral spreading;

and having at the zone where the metal of the blade extends into the remainder a portion of still greater cross-sectional area forming a shoulder for positioning of the blade.

4. An electricity meter current circuit which includes a current coil and connector blades by which the meter current circuit is incorporated into a circuit outside of the meter, characterized in that the blades and the coil comprise a continuous one piece unit, each blade being a flat portion of the same stock as the coil, and of greater cross-section area;

and being in a cross work-hardened condition of having been thickened by forshortening and then laterally spread, both by cold-flow squeezing;

and having at the zone where the metal of the blade extends into the remainder a portion of still greater cross-sectional area forming a collar for bearing on a sealing washer.

5. An electricity meter current circuit which includes a current coil and connector blades by which the meter current circuit is incorporated into a circuit outside of the meter, characterized in that the blades and the coil comprise a continuous one-piece unit, each blade being a flat portion of the same stock as the coil, and of greater cross-sectional area;

and being in a cross work-hardened condition of having been thickened by foreshortening and then laterally spread, both by cold-flow squeezing;

and having at the zone where the metal of the blade extends into the remainder a portion of still greater cross-sectional area forming a collar for bearing on a sealing washer, the portion adjacent the collar and beyond it from the blade being in a sharply bent condition.

6. A current circuit for electricity meters including terminal blades and a conductor extending between them, characterized by:

said blades and conductor being of one piece, and at their meeting zone having a collar, said collar being in flattened condition and substantially flush on both sides with the side of the conductor; and said blades being in flattened condition, and of cross-sectional area greater than the conductor as a result of lengthwise compaction.

7. An electricity meter current circuit which includes a current coil and connector blades by which the meter current circuit is incorporated into a circuit outside of the meter, characterized in that the blades and the coil comprise a continuous one piece unit, each blade being a flat portion of the same stock as the coil, and of greater cross-sectional area;

and being in a cross work-hardened condition of having been thickened by forshortening and then laterally spread, both by cold-flow squeezing;

said circuit being formed by a wire clad with a surface metal of higher corrosion-resistance than the heart of the wire, said surface metal being spread out over the greater area of the blades and covering its flat surface areas imperviously.

8. An electricity meter current circuit which includes a current coil and connector blades by which the meter current circuit is incorporated into a circuit outside of the meter, characterized by the improvement in which the blades and the coil comprise a continuous one piece unit which includes wire-like portions forming the current coil and a linking portion between the coil and a blade, the linking portion being severely bent at the region of the linking portion which is adjacent to the blade, the wire-like portions having bends in planes crossing one another and the blades being of greater cross-sectional area than the wire-like portion as a result of lengthwise compaction.

9. A one-piece electricity meter current circuit comprising a coil portion and a coil lead portion, and having a connector blade at each end of the one-piece circuit, the entire circuit being formed from a continuous one-piece mass of work-hardenable conductive metal, at least one of the lead portions being sharply bent in the region adjacent to a blade, the blades having fastening means integral therewith for orienting the blades and for coacting with the meter's means for positioning the blade, the blade being cross work-hardened metal.

10. A one-piece electricity meter current circuit comprising a coil portion and a coil lead portion, and having a connector blade at each end of the one-piece circuit, the entire circuit being formed from a continuous one-piece mass of work-hardenable conductive metal, at least one of the lead portions being sharply bent in the region of the coil lead portion immediately adjacent to a blade, the blades having fastening means, integral therewith for orienting the blades and for coaction with the meter's means for positioning the blade, including a collar extending radially therefrom in the region adjacent to the coil lead portion, the blade being cross work-hardened metal.

11. In an electricity meter having an insulating base plate, an electric current circuit which includes connector blades and a current coil and coil leads between said connector blades; an elastomeric washer adapted to closely fit the blades, and locking means for retaining the blades in position on the base plate; the improvement in which the blades, the coil, and the coil leads are an integral unit of the same piece of metal, each blade having, as part of the same piece, a collar in the region of the blade adjacent the coil lead portion; the insulating base plate having openings therein through which the blades pass and through which the collar will not pass, the integral shoulder directly abutting the elastomeric washer and tightly compressing the elastomeric washer between said collar and the insulating base plate, the compression being maintained by said locking means.

* * * * *